United States Patent
Zhu et al.

(10) Patent No.: US 9,552,157 B2
(45) Date of Patent: Jan. 24, 2017

(54) MODE-DEPENDENT ACCESS TO EMBEDDED MEMORY ELEMENTS

(71) Applicant: Advanced Micro Devices, Inc., Sunnyvale, CA (US)

(72) Inventors: Yunpeng Zhu, Shanghai (CN); Xianshuai Shi, Shanghai (CN); Yan Liu, Shanghai (CN)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 238 days.

(21) Appl. No.: 14/259,491

(22) Filed: Apr. 23, 2014

(65) Prior Publication Data
US 2015/0212737 A1    Jul. 30, 2015

(30) Foreign Application Priority Data
Jan. 24, 2014    (CN) .......................... 2014 1 0034860

(51) Int. Cl.
G06F 12/00    (2006.01)
G06F 13/00    (2006.01)
G06F 3/06    (2006.01)

(52) U.S. Cl.
CPC ........... *G06F 3/0604* (2013.01); *G06F 3/0634* (2013.01); *G06F 3/0673* (2013.01)

(58) Field of Classification Search
CPC .............. G06F 13/1657; G06F 13/1663; G06F 15/17331; G06F 2212/254
See application file for complete search history.

(56) References Cited

U.S. PATENT DOCUMENTS

| | | | | |
|---|---|---|---|---|
| 6,924,810 B1* | 8/2005 | Tischler | .............. | G06F 12/0811 345/533 |
| 9,164,905 B2* | 10/2015 | Inoue | .................. | G06F 12/0802 |
| 2001/0047450 A1* | 11/2001 | Gillingham | ......... | G06F 13/1689 711/105 |
| 2004/0246103 A1* | 12/2004 | Zukowski | ............... | G06F 21/79 340/10.41 |
| 2005/0257177 A1* | 11/2005 | Chen | .................... | G06F 17/5045 716/106 |
| 2006/0221718 A1* | 10/2006 | Ono | ........................ | G11C 16/22 365/189.04 |
| 2008/0162980 A1* | 7/2008 | Dahan | ................. | G06F 13/1694 713/601 |
| 2009/0157950 A1* | 6/2009 | Selinger | .............. | G06F 12/0246 711/103 |
| 2009/0228164 A1* | 9/2009 | Banerjee | ................ | A61G 5/045 701/22 |
| 2010/0011215 A1* | 1/2010 | Lior | .................... | H04L 63/0823 713/176 |

(Continued)

*Primary Examiner* — Sean D Rossiter
(74) *Attorney, Agent, or Firm* — Park, Vaughan, Fleming & Dowler LLP (57) ABSTRACT

A system has a plurality of functional modules including a first functional module and one or more other functional modules. The first functional module includes an embedded memory element and is configurable in a plurality of modes including a first mode and a second mode. When the first functional module is in the first mode, access to the embedded memory element is limited to the first functional module. At least one of the one or more other functional modules is provided with access to the embedded memory element based at least in part on the first functional module being in the second mode.

20 Claims, 7 Drawing Sheets

(56) References Cited

U.S. PATENT DOCUMENTS

| | | | |
|---|---|---|---|
| 2010/0257313 A1* | 10/2010 | Nishizawa | G06K 19/0719 711/115 |
| 2013/0162682 A1* | 6/2013 | Quero | G09G 5/34 345/649 |
| 2014/0195744 A1* | 7/2014 | Fleischer | G06F 13/1663 711/151 |
| 2015/0123977 A1* | 5/2015 | Kanuri | G09G 5/00 345/502 |
| 2016/0147534 A1* | 5/2016 | Lewis | G06F 9/30145 712/216 |

* cited by examiner

MODE-DEPENDENT ACCESS TO EMBEDDED MEMORY ELEMENTS

RELATED APPLICATIONS

Pursuant to the provisions of 35 U.S.C. §119, this application claims benefit of foreign priority from the Chinese Patent Application No. 201410034860.7, filed Jan. 24, 2014 with the State Intellectual Property Office (SIPO) in the People's Republic of China; the aforementioned priority application being hereby incorporated by reference in its entirety for all purposes.

TECHNICAL FIELD

The present embodiments relate generally to memory management, and more specifically to mode-dependent access to memory elements embedded in functional modules.

BACKGROUND

An electronic system may include memory elements with relatively low latency, such as registers and caches, as well as high-latency memory, such as main memory. Accessing the high-latency memory takes longer and consumes more power than accessing the low-latency memory. However, the capacity of the high-latency memory is greater than the capacity of the low-latency memory. Also, access to the low-latency memory may be limited to particular functional modules within the system.

SUMMARY OF ONE OR MORE EMBODIMENTS

In some embodiments, an electronic system has a plurality of functional modules including a first functional module and one or more other functional modules. The first functional module includes an embedded memory element and is configurable in a plurality of modes including a first mode and a second mode. Access to the embedded memory element is limited to the first functional module when the first functional module is in the first mode. The electronic system further includes a controller to provide at least one of the one or more other functional modules with access to the embedded memory element based at least in part on the first functional module being in the second mode.

In some embodiments, a method is performed in a system that has a plurality of functional modules including a first functional module and one or more other functional modules. The first functional module includes an embedded memory element. In the method, when the first functional module is in a first mode, access to the embedded memory element is limited to the first functional module. At least one of the one or more other functional modules is provided with access to the embedded memory element based at least in part on the first functional module being in a second mode.

In some embodiments, a non-transitory computer-readable storage medium stores one or more programs configured for execution by a controller. The controller is part of a system that also includes a first functional module and one or more other functional modules. The first functional module includes an embedded memory element and is configurable in a first mode and a second mode. The one or more programs include instructions to add to an address translation table a mapping of a logical address to a physical address of the embedded memory element when the first functional module is in the second mode. The one or more programs also include instructions to remove the mapping of the logical address to the physical address from the address translation table in response to a transition of the first functional module from the second mode to the first mode.

BRIEF DESCRIPTION OF THE DRAWINGS

The present embodiments are illustrated by way of example and are not intended to be limited by the figures of the accompanying drawings.

Like reference numerals refer to corresponding parts throughout the figures and specification.

DETAILED DESCRIPTION

Reference will now be made in detail to various embodiments, examples of which are illustrated in the accompanying drawings. In the following detailed description, numerous specific details are set forth in order to provide a thorough understanding of the disclosure. However, some embodiments may be practiced without these specific details. In other instances, well-known methods, procedures, components, and circuits have not been described in detail so as not to unnecessarily obscure aspects of the embodiments.

Figure 1:
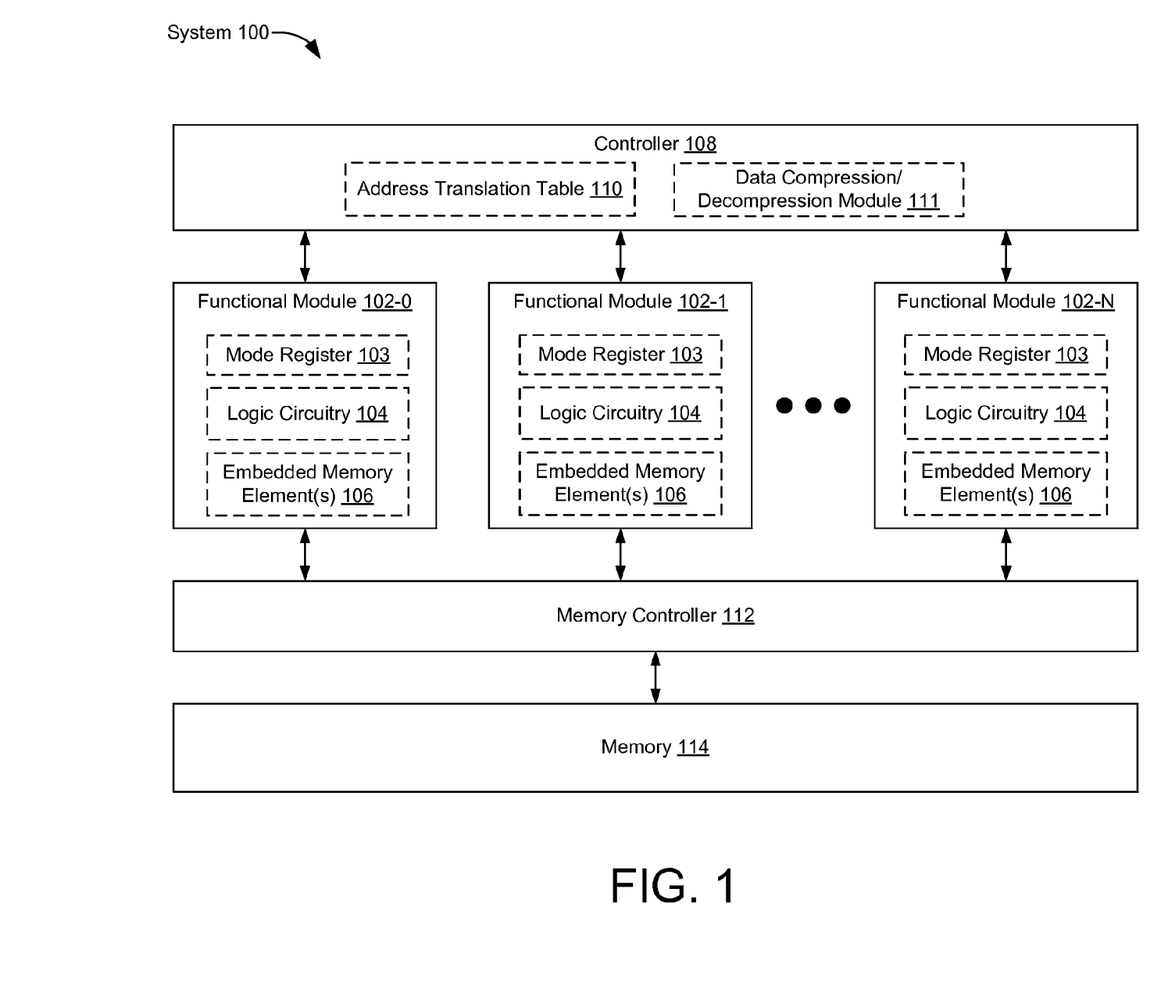
FIGS. 1 and 2 are block diagrams of systems that include a plurality of functional modules with embedded memory elements in accordance with some embodiments.

FIG. 1 is a block diagram of a system 100 that includes a plurality of functional modules 102-0 through 102-N, where N is an integer greater than or equal to one, in accordance with some embodiments. Each of the functional modules 102-0 through 102-N includes logic circuitry 104 and one or more embedded memory elements 106. Examples of embedded memory elements 106 include, but are not limited to, registers, arrays of registers, and cache memories (e.g., implemented using static random-access memory (SRAM)). Different embedded memory elements 106 in the system 100 may have different sizes, including different data widths and different data depths.

The functional modules 102-0 through 102-N are coupled to a memory controller 112, which is coupled to a memory 114 (e.g., main memory). In some embodiments, the memory 114 is implemented using dynamic random-access memory (DRAM). In some embodiments, the memory 114 is double-data-rate (DDR) memory. The memory controller 112 provides the functional modules 102-0 through 102-N with access to the memory 114. For example, the memory controller 112 performs address translation (e.g., using an address translation table, which may be implemented using page tables) to translate logical addresses specified by memory access requests from the functional modules 102-0 through 102-N to physical addresses of respective locations in the memory 114. Data is then read from or written to these physical addresses in the memory 114. The memory 114 is a global memory, since it is accessible by all of the functional modules 102-0 through 102-N.

The functional modules 102-0 through 102-N are also coupled to a controller 108. The controller 108 may provide each of the functional modules 102-0 through 102-N with access to embedded memory elements 106, depending on how the embedded memory elements 106 are configured. For example, each embedded memory element 106 may be configured as a local memory element or a global memory element. When configured as a local memory element, an embedded memory element 106 is only accessible by the functional module 102 in which it is located. When configured as a global memory element, an embedded memory element 106 is accessible by other functional modules 102 besides the functional module 102 in which it is located.

The controller 108 determines that an embedded memory element 106 that is configured as a global memory is available to the other functional modules 102, gathers the physical address or addresses associated with the embedded memory element 106, and maps one or more logical addresses to the physical address or addresses associated with the embedded memory element 106 in an address translation table 110. The controller 108 subsequently receives a memory access request from one of the other functional modules 102 specifying a logical address that maps to a physical address associated with the embedded memory element 106. The controller 108 routes the request (as updated to specify the physical address) to the embedded memory element 106, where a memory access operation corresponding to the request is performed. When the embedded memory element 106 is reconfigured as a local memory element, the controller 108 releases the physical address or addresses associated with the embedded memory element 106 (e.g., by deleting the corresponding mappings from the address translation table 110). At this point the embedded memory element 106 is no longer accessible to the other functional modules 102. The functional modules 102-0 through 102-N may each be configured in a first mode or a second mode with respect to their embedded memory elements 106. In the first mode, the one or more embedded memory elements 106 in a respective functional module 102 are configured as local memory elements, such that they are only accessible by the respective functional module 102. In the second mode, the one or more embedded memory elements 106 in a respective functional module 102 are configured as global memory elements, such that they are accessible by other functional modules 102 besides (e.g., instead of) the respective functional module. The mode for each of the functional modules 102-0 through 102-N may be set by storing a value specifying the mode in a respective mode register 103.

For example, when the functional module 102-0 is in the second mode, the controller 108 may allocate the one or more embedded memory elements 106 to one or more of the functional modules 102-1 through 102-N. In one example, a memory space corresponding to an entire embedded memory element 106 in the functional module 102-0 is allocated to the functional module 102-1. In another example, a memory space corresponding to a first portion of an embedded memory element 106 is allocated to the functional module 102-1. A memory space corresponding to a second portion of the embedded memory element 106 may be allocated to the functional module 102-N. In yet another example, a memory space corresponding to multiple embedded memory elements 106 in the functional module 102-0 is allocated to the functional module 102-1. Other examples are also possible. These allocations are performed, for example, by adding logical-to-physical address mappings to the address translation table 110.

In some embodiments, the functional modules 102-0 through 102-N select between the first mode and second mode based on their power modes. For example, a functional module 102 may select the first mode when in a relatively high-power mode and may select the second mode when in a relatively low-power mode. The first mode thus may correspond to a high-power mode (e.g., an operating mode) for a functional module 102 and the second mode thus may correspond to a low-power mode (e.g., an idle mode, or alternatively another operating mode with lower power consumption than the high-power mode) for the functional module 102.

By making embedded memory elements 106 globally available when their functional modules 102 are in the second mode, the controller 108 virtualizes the storage capacity provided by the embedded memory elements 106. The controller 108 therefore may be referred to as a virtualized controller.

The embedded memory elements 106 have lower latencies than the memory 114: the number of clock cycles taken to access the embedded memory elements 106 is less than the number of clock cycles taken to access the memory 114. Accessing the embedded memory elements 106 also consumes less power than accessing the memory 114. Making respective embedded memory elements 106 globally accessible when their corresponding functional modules 102 are in the second mode thus provides power and performance benefits, by reducing use of the memory 114 in favor of the globally accessible embedded memory elements 106.

In some embodiments, a functional module 102 is aware of whether a memory access request is directed to the memory 114 or to an embedded memory element 106 in another functional module, and directs the memory access request to either the controller 112 or the controller 108 accordingly. In some other embodiments, a memory access request is first provided to the controller 108. If the controller 108 cannot service the request, because the request corresponds to a memory location in the memory 114, then the request is provided to the controller 112.

In some embodiments, the logic circuitry 104 in each of the functional modules 102-0 through 102-N is in a different power domain than the one or more embedded elements 106. The logic circuitry 104 of a respective functional module 102 therefore may be power-gated when the respective functional module 102 is in the second mode (e.g., as a result of being in an idle mode), such that the logic circuitry 104 is not powered when the respective functional module 102 is in the second mode. The one or more embedded elements 106 continue to receive power, however, when the respective functional module 102 is in the second mode. Both power domains—and thus both the logic circuitry 104 and the one or more embedded elements 106—receive power when the respective functional module 102 is in the first mode (e.g., as a result of being in an operating mode).

In some embodiments, the controller 108 includes a data compression and decompression module 111 that compresses data written to the embedded memory elements 106 and decompresses data read from the embedded memory elements 106 (e.g., before providing the data to a functional module 102 that requested the data). Similarly, the memory controller 112 may include a compression and decompression module (not shown) for compressing data written to the memory 114 and decompressing data read from the memory 114 (e.g., before providing the data to a functional module 102 that requested the data).

In some embodiments, the functional modules 102-0 through 102-N, controller 108, and/or memory controller 112 are implemented in a single integrated circuit and thus compose a system-on-a-chip (SOC), while the memory 114 is implemented using one or more external integrated circuits. Other configurations are possible.

Figure 2:
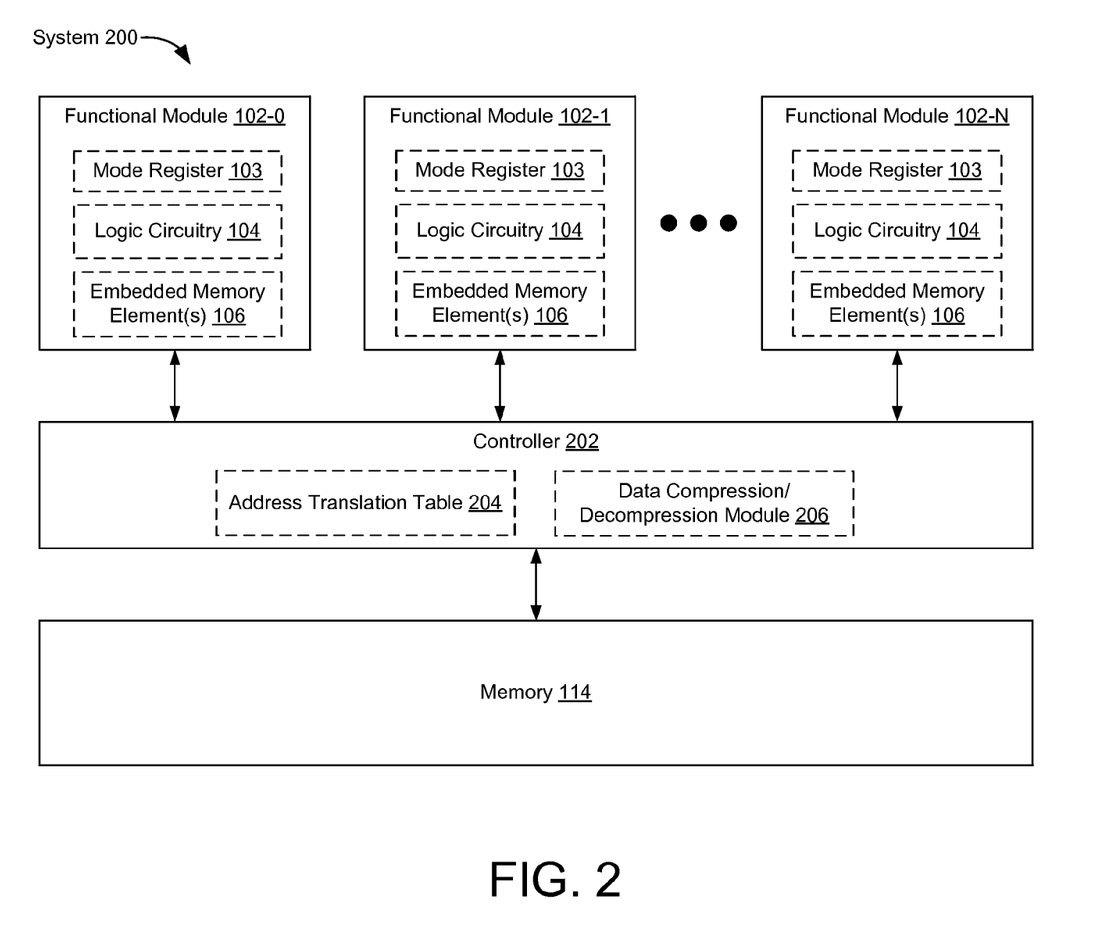

FIG. 2 is a block diagram of a system 200 that is an alternative to the system 100 (FIG. 1) in accordance with some embodiments. In the system 200, a controller 202 combines the functionality of the controller 108 and controller 112 from the system 100. The controller 202 thus provides the functional modules 102-0 through 102-N with access to the memory 114 and with access to embedded memory elements 106. Access to an embedded memory element 106 is limited to the respective functional module 102 in which it is located when the respective functional module 102 is in the first mode and is provided to other functional modules 102 when the respective functional module 102 is in the second mode, as described with respect to the system 100 (FIG. 1). The controller 202 includes an address translation table 204 that translates logical addresses to physical addresses in the memory 114 and in embedded memory elements 106. The controller 202 may also include a data compression and decompression module 206 that compresses data written to the embedded memory elements 106 and/or memory 114, and decompresses data read from the embedded memory elements 106 and/or memory 114.

In some embodiments, the system 100 (FIG. 1) or 200 (FIG. 2) is a multimedia processing system in which the functional modules 102-0 through 102-N include a display controller, video decoder, video encoder, and image processor. These functional modules 102-0 through 102-N may be situated in a multimedia processor (e.g., which also includes the controller 108 and/or memory controller 112, or the controller 202). In some embodiments, the system 100 (FIG. 1) or 200 (FIG. 2) is a graphics processing system in which the functional modules 102-0 through 102-N include a display controller, video decoder, video encoder, and three-dimensional (3D) graphics engine. These functional modules 102-0 through 102-N may be situated in a graphics processing unit (GPU) (e.g., which also includes the controller 108 and/or memory controller 112, or the controller 202). The 3D graphics engine renders images that are consumed by the display controller. The memory 114 may include a frame buffer for storing image frames.

In some embodiments, the second mode of a 3D graphics engine corresponds to a static-screen mode in which an image remains unchanged for successive frames, and the first mode of the 3D graphics engine corresponds to a mode in which the image is not static but instead varies for successive frames. In the second mode, the 3D graphics engine is idle and the one or more embedded memory elements 106 of the 3D graphics engine are allocated to the display controller, which uses them to store all or a portion of the static image. If the one or more embedded memory elements 106 of the 3D graphics engine are sufficient to store the entire static image, the frame buffer in the memory 114 may be power-gated to save power. If the one or more embedded memory elements 106 of the 3D graphics engine store only a portion of the static image, the number of memory accesses to the frame buffer is reduced, thus saving power.

Different network topologies may be used to couple embedded memory elements 106 to the controller 108. For example, embedded memory elements 106 may be coupled to the controller 108 in a chain, crossbar, mesh, or other topology.

Figure 3:
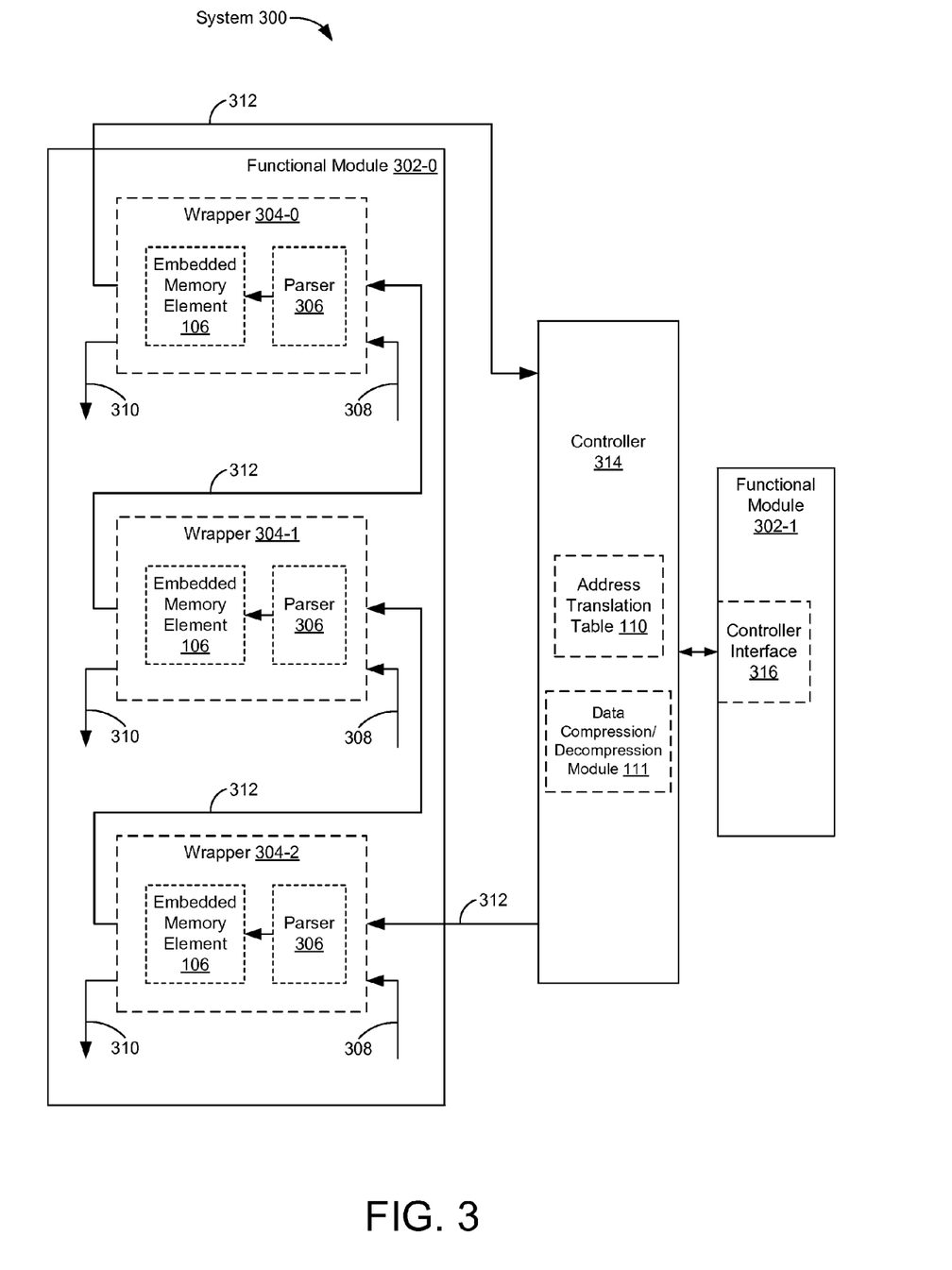
FIG. 3 is a block diagram of a system in which a functional module includes a plurality of embedded memory elements coupled to a controller in a chain, in accordance with some embodiments.

FIG. 3 is a block diagram of a system 300 in which a functional module 302-0 includes a plurality of embedded memory elements 106 (e.g., three embedded memory elements 106) coupled to a controller 314 in a chain 312 (e.g., a ring), in accordance with some embodiments. Another functional module 302-1 is also coupled to the controller 314. The system 300 is an example of the system 100 (FIG. 1) or 200 (FIG. 2). The functional module 302-0 is an example of the functional module 102-0 (FIG. 1 or 2). The controller 314 is an example of the controller 108 (FIG. 1) or 202 (FIG. 2). The functional module 302-1 may be an example of one of the functional modules 102-1 through 102-N (FIG. 1 or 2). Other elements of the system 300, such as the memory 114 (FIG. 1 or 2), are not shown for simplicity.

Each of the embedded memory elements 106 in the functional module 302-0 has an associated wrapper 304 (e.g., wrapper 304-0, 304-1, or 304-2) that acts as an interface to the embedded memory element 106. When the functional module 302-0 is in the first mode, the wrappers 304-0, 304-1, and 304-2 receive memory access requests through local inputs 308 and provide data corresponding to the memory access requests through local outputs 310. The memory access requests received through the local inputs 308 are generated within the functional module 302-0 (e.g., by logic circuitry 104, FIG. 1 or 2, within the functional module 302-0). Data provided through the local outputs 310 is provided, for example, to logic circuitry 104 (FIG. 1 or 2) within the functional module 302-0. When the functional module 302-0 is in the second mode, the wrappers 304-0, 304-1, and 304-2 receive memory access requests from the controller 314 through the chain 312 and provide data corresponding to the memory access requests to the controller 314 through the chain 312. For example, the controller 314 may signal the wrappers 304-0, 304-1, and 304-2 to select memory access requests provided through the chain 312. Alternatively, the wrappers 304-0, 304-1, and 304-2 may be configured to select memory access requests provided through the chain 312 based on a value stored in a mode register 103 (FIG. 1 or 2) of the functional module 302-0.

Respective memory elements 106 may have data widths that are different from the data width of the chain 312. The wrappers 304-0, 304-1, and 304-2 adapt the data widths of their respective embedded memory elements 106 to the data width of the chain 312.

The chain 312 couples the wrappers 304-0, 304-1, and 304-2 with each other and the controller 314 in series. A first segment of the chain 312 couples the controller 314 to the wrapper 304-2. A second segment of the chain 312 couples the wrapper 304-2 to the wrapper 304-1. A third segment of the chain 312 couples the wrapper 304-1 to the wrapper 304-0. A final segment of the chain couples the wrapper 304-0 to the controller 314.

In some embodiments, the controller 314 transmits tokens specifying memory access requests through the chain 312. A respective token specifies read-enable or write-enable information, an address (e.g., a physical address of an embedded memory element 106 or portion thereof), data (e.g., for write operations), and burst length. The token may also specify an identifier (ID) of the embedded memory element 106 to which the corresponding memory access request is directed. Each of the wrappers 304-0, 304-1, and 304-2 includes a parser 306 to parse the token and determine whether the memory access request specified by the token is directed to the embedded memory element 106 in the wrapper 304-0, 304-1, or 304-2. For example, the parser 306 determines whether the ID in the token matches the ID of the embedded memory element 106 in the wrapper 304-0, 304-1, or 304-2. If the IDs match, the parser 306 provides the token to the embedded memory element 106, which performs the requested memory access operation. If the requested memory access operation is a read, the embedded memory element 106 outputs the data onto the chain 312. If the IDs do not match, the parser 306 forwards the token to the next wrapper 304-0 or 304-1 in the chain 312.

In some embodiments, the wrappers 304-0, 304-1, and 304-2, parsers 306, and embedded memory elements 106 in the functional module 302-0 are in a dedicated power domain separate from a power domain for other circuitry (e.g., logic circuitry 104, FIG. 1 or 2) in the functional module 302-0. The wrappers 304-0, 304-1, and 304-2, parsers 306, and embedded memory elements 106 in the functional module 302-0 thus receive power in the second mode (as well as in the first mode), while the other circuitry (e.g., logic circuitry 104, FIG. 1 or 2) in the functional module 302-0 may be power-gated in the second-mode (but receives power in the first mode).

The functional module 302-1 includes a controller interface 316 through which it provides memory access requests to the controller 314 and receives data from the controller 314. The controller 314 may allocate all or a portion of the embedded memory elements 106 in the functional module 302-0 to the functional module 302-1 when the functional module 302-0 is in the second mode (e.g., idle mode). This allocation is performed through logical-to-physical address mapping in the address translation table 110 (FIG. 1) or 204 (FIG. 2). For example, the controller 314 receives a memory access request specifying a logical address from the controller interface 316 of the functional module 302-1. The controller 314 translates the logical address to a physical address using the address translation table 110 or 204. The physical address may correspond to one of the embedded memory elements 106; if it does, the controller 314 transmits a token for the memory access request onto the chain 312. If the memory access request is a read request, the controller 314 receives the requested data through the chain 312 and provides the data to the functional module 302-1 through the controller interface 316. The controller 314 releases the embedded memory elements 106 to the functional module 302-0 when the functional module 302-0 transitions from the second mode to the first mode. For example, the controller 314 removes the relevant mappings from the address translation table 110.

In some embodiments, the functional module 302-0 is a 3D graphics engine, the functional module 302-1 is a display controller, the second mode of the 3D graphics engine corresponds to the static-screen mode in which an image is fixed for successive frames, and the first mode of the 3D graphics engine corresponds to the mode in which the 3D graphics engine renders images that vary from frame to frame. Alternatively, the functional module 302-1 corresponds to a display controller and the functional module 302-0 corresponds to a video decoder or video encoder. Other examples are also possible.

Figure 4:
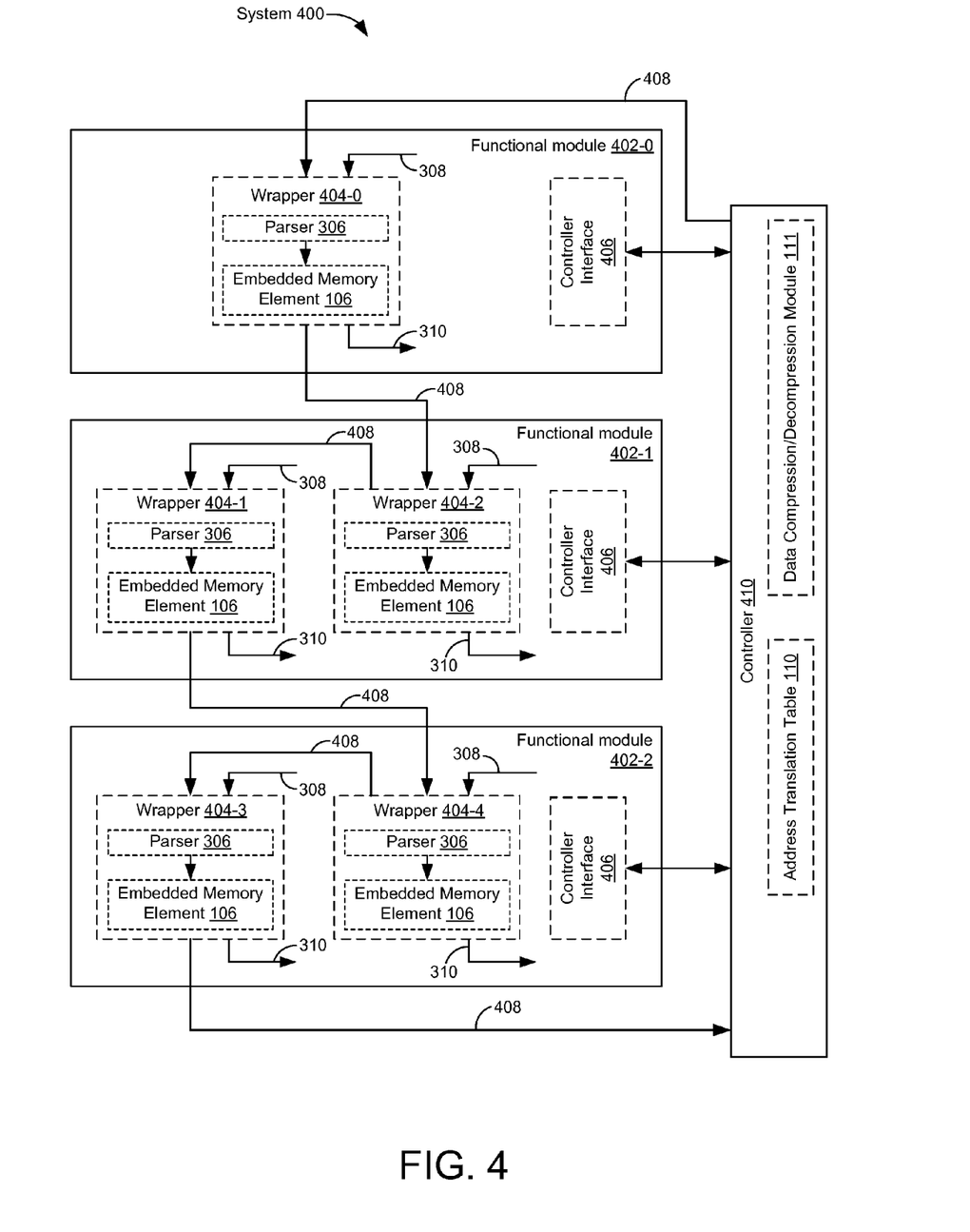
FIG. 4 is a block diagram of a system in which embedded memory elements in multiple functional modules are coupled to a controller through a chain, in accordance with some embodiments.

FIG. 4 is a block diagram of a system 400 in which embedded memory elements 106 in multiple functional modules 402-0, 402-1, and 402-2 are coupled to each other and a controller 410 through a chain 408 (e.g., a ring), in accordance with some embodiments. The system 400 is an example of the system 100 (FIG. 1) or 200 (FIG. 2). The functional modules 402-0 through 402-2 are examples of functional modules 102-0 through 102-N (FIG. 1 or 2). The controller 410 is an example of the controller 108 (FIG. 1) or 202 (FIG. 2). Other elements of the system 400, such as the memory 114 (FIG. 1 or 2), are not shown for simplicity.

Each of the embedded memory elements 106 in the functional modules 402-0, 402-1, and 402-2 has an associated wrapper 404 that includes a parser 306 and functions as described for the wrappers 304 (FIG. 3). In the example of FIG. 4, a first functional module 402-0 has a single embedded memory element 106 in a wrapper 404-0. A second functional module 402-1 has two embedded memory elements 106 in respective wrappers 404-1 and 404-2. A third functional module 402-2 has two embedded memory elements 106 in respective wrappers 404-3 and 404-4. The chain 408 couples the wrappers 404-0 through 404-4 to each other and the controller 410 in series, as shown. Each embedded memory element 106 is locally accessible when its functional module 402-0, 402-1, or 402-2 is in a first mode and globally accessible when its functional module 402-0, 402-1, or 402-2 is in a second mode. The controller 410 controls this global accessibility, as previously described for the controllers 108 (FIG. 1), 202 (FIG. 2), and 314 (FIG. 3).

Each of the functional modules 402-0, 402-1, and 402-2 has a controller interface 406 that is coupled to the controller 410 through a coupling distinct from the chain 408. The functional modules 402-0, 402-1, and 402-2 provide memory access requests (e.g., specifying logical addresses) to the controller 410. If an address specified in a memory access request corresponds to an embedded memory element 106 (e.g., maps to a physical address of a memory element 106), the controller 410 transmits a token specifying the memory access request (e.g., as described with respect to FIG. 3) onto the chain 408. If the memory access request is a read request, the controller 410 receives data from the embedded memory element 106 to which the read request was directed through the chain 408. The controller 410 provides this data to the appropriate functional module 402-0, 402-1, or 402-2 through a respective controller interface 406.

In some embodiments, the wrapper(s) 404, parser(s) 306, and embedded memory element(s) 106 in each of the functional modules 402-0, 402-1, and 402-2 are in a dedicated power domain separate from a power domain for other circuitry (e.g., logic circuitry 104, FIG. 1 or 2) in the functional module 402-0, 402-1, or 402-2. The wrapper(s) 404, parser(s) 306, and embedded memory element(s) 106 in each of the functional modules 402-0, 402-1, and 402-2 thus receive power in the second mode (as well as the first mode), while the other circuitry (e.g., logic circuitry 104, FIG. 1 or 2) in each of the functional modules 402-0, 402-1, and 402-2 may be power-gated in the second-mode (but receives power in the first mode).

If the first functional module 402-0 is in the first mode (e.g., operating mode) and the second and third functional modules 402-1 and 402-2 are in the second mode (e.g., idle mode), then the embedded memory elements 106 in the wrappers 404-1, 404-2, 404-3, and 404-4 may be allocated to the first functional module 402-0. If the second functional module 402-1 is in the first mode (e.g., operating mode) and the first and third functional modules 402-0 and 402-2 are in the second mode (e.g., idle mode), then the embedded memory elements 106 in the wrappers 404-0, 404-3, and 404-4 may be allocated to the second functional module 402-1. If the third functional module 402-2 is in the first mode (e.g., operating mode) and the first and second functional modules 402-0 and 402-1 are in the second mode (e.g., idle mode), then the embedded memory elements 106 in the wrappers 404-0, 404-1, and 404-2 may be allocated to the third functional module 402-2.

If the first and second functional modules 402-0 and 402-1 are in the first mode (e.g., operating mode) and the third functional module 402-2 is in the second mode (e.g., idle mode), then the embedded memory elements 106 in the wrappers 404-3 and 404-4 may be allocated entirely to the first functional module 402-0 or the second functional module 402-1, or may be divided between the first functional module 402-0 and the second functional module 402-1. Similar allocation may be performed for other pairs of functional modules 402 in the first mode (e.g., operating mode) when a third functional module 402 is in the second mode (e.g., idle mode).

If all of the functional modules 402-0, 402-1, and 402-2 are in the first mode, then the embedded memory element 106 in each of the wrappers 404-0 through 404-4 is only accessible by the functional module 402-0, 402-1, or 402-2 in which it is embedded.

The number of functional modules 402 in the system 400 may vary. For example, embedded memory elements 106 in a display controller, video decoder, video encoder, and image processor or 3D graphics engine may be coupled using a chain such as the chain 408.

Figure 5:
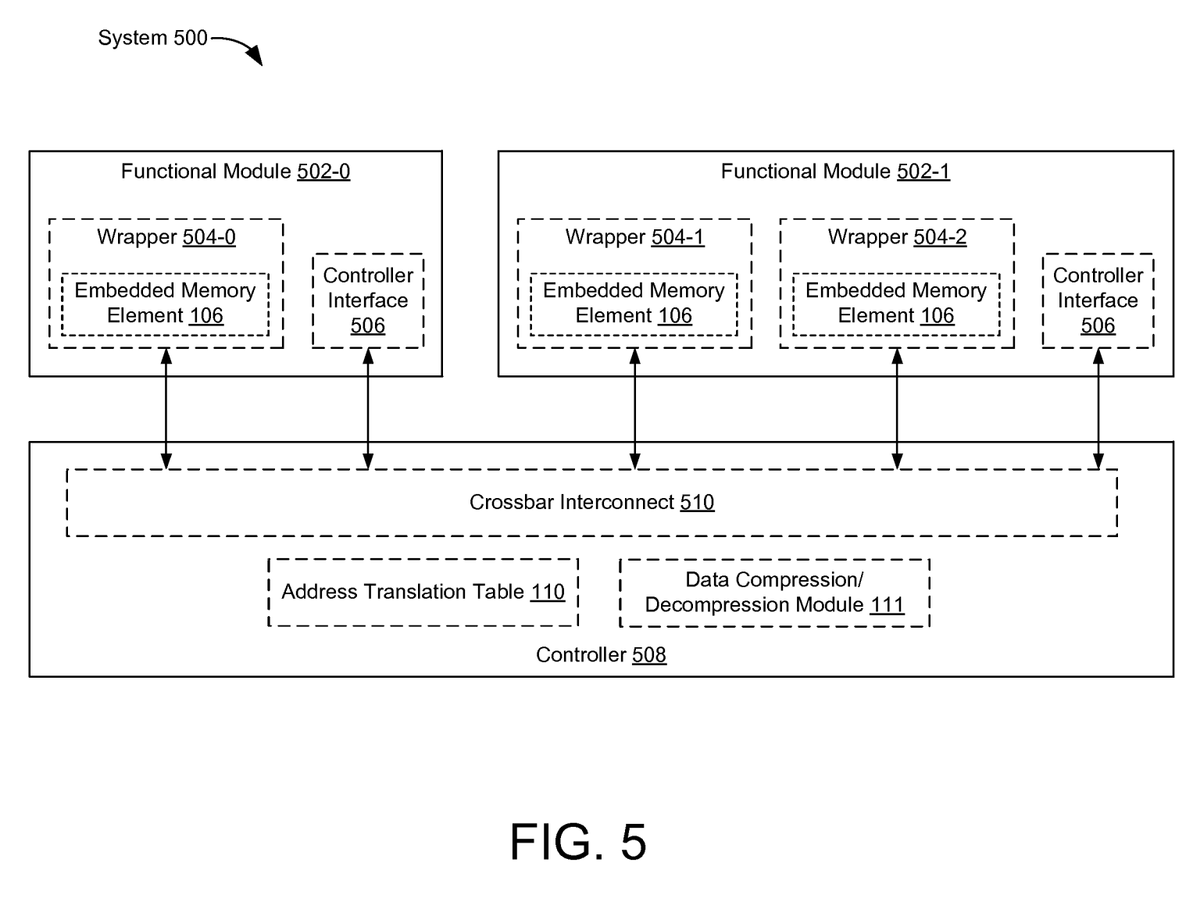
FIG. 5 is a block diagram of a system in which embedded memory elements in multiple functional modules are coupled to a controller through a crossbar interconnect, in accordance with some embodiments.

FIG. 5 is a block diagram of a system 500 in which embedded memory elements 106 in multiple functional modules 502-0 and 502-1 are coupled to a controller 508 through a crossbar interconnect 510, in accordance with some embodiments. The system 500 is an example of the system 100 (FIG. 1) or 200 (FIG. 2). The functional modules 502-0 and 502-1 are examples of functional modules 102-0 through 102-N (FIG. 1 or 2). The controller 508 is an example of the controller 108 (FIG. 1) or 202 (FIG. 2). Other elements of the system 500, such as the memory 114 (FIG. 1 or 2), are not shown for simplicity. While the crossbar interconnect 510 is shown as part of the controller 508, it may be separate from the controller 508.

Each of the embedded memory elements 106 has an associated wrapper 504 that is coupled to the controller 508 through the crossbar interconnect 510. A first functional module 502-0 has an embedded memory element 106 in a wrapper 504-0. A second functional module 502-1 has an embedded memory element 106 in a wrapper 504-1 and an embedded memory element 106 in a wrapper 504-2. The wrappers 504-0 through 504-2 adapt data widths of the embedded memory elements 106 to a data width used by the controller 508. Because the crossbar interconnect 510 provides direct communication between the controller 508 and each of the wrappers 504-0 through 504-2, the wrappers 504-0 through 504-2 do not include parsers 306.

Each of the functional modules 502-0 and 502-1 includes a controller interface 506 to communicate with the controller 508 through the crossbar interconnect 510. The functional modules 502-0 and 502-1 provide memory access requests to the controller 508 through the controller interface 506 and receive data from the controller 508 through the controller interface 506 in response to the memory access requests. For memory access requests directed to embedded memory elements 106, the controller provides the memory access requests to the corresponding wrappers 504-0, 504-1, and 504-2 through the crossbar interconnect 510. For read requests, the controller 508 receives data from the wrappers 504-0, 504-1, and 504-2 through the crossbar interconnect 510 in response.

In some embodiments, all accesses of embedded memory elements 106 are performed through the controller 508, regardless of the mode. For example, when a functional module 502-0 or 502-1 is in the first mode, such that its embedded memory element(s) 106 are dedicated for local use, the functional module 502-0 or 502-1 accesses its embedded memory element(s) 106 by transmitting memory access requests through its controller interface 506 to the controller 508. The controller provides the memory access requests to the wrappers 504-0, 504-1, and 504-2. Accordingly, the wrappers 504-0, 504-1, and 504-2 do not have local inputs 308 and local outputs 310. (Alternatively, however, the wrappers 504-0, 504-1, and 504-2 may have local inputs 308 and local outputs 310 for performing local accesses.) When the functional module 502-0 or 502-1 is in the second mode, its embedded memory element(s) 106 may be allocated to the other functional module 502-1 or 502-0, which accesses the embedded memory element(s) 106 through the controller 508, by providing memory access requests to the controller 508 through the controller interface 506.

In some embodiments, the wrapper(s) 504 and embedded memory element(s) 106 in each of the functional modules 502-0 and 502-1 are in a dedicated power domain separate from a power domain for other circuitry (e.g., logic circuitry 104, FIG. 1 or 2) in the functional module 502-0 or 502-1. The wrapper(s) 504 and embedded memory element(s) 106 in each of the functional modules 502-0 and 502-1 thus receive power in the second mode (as well as the first mode), while the other circuitry (e.g., logic circuitry 104, FIG. 1 or 2) in each of the functional modules 502-0 and 502-1 may be power-gated in the second-mode (but receives power in the first mode).

In some embodiments, a display controller, video decoder, video encoder, and image processor or 3D graphics engine are coupled to the controller 108 through an interconnect such as the crossbar interconnect 510.

Figure 6:
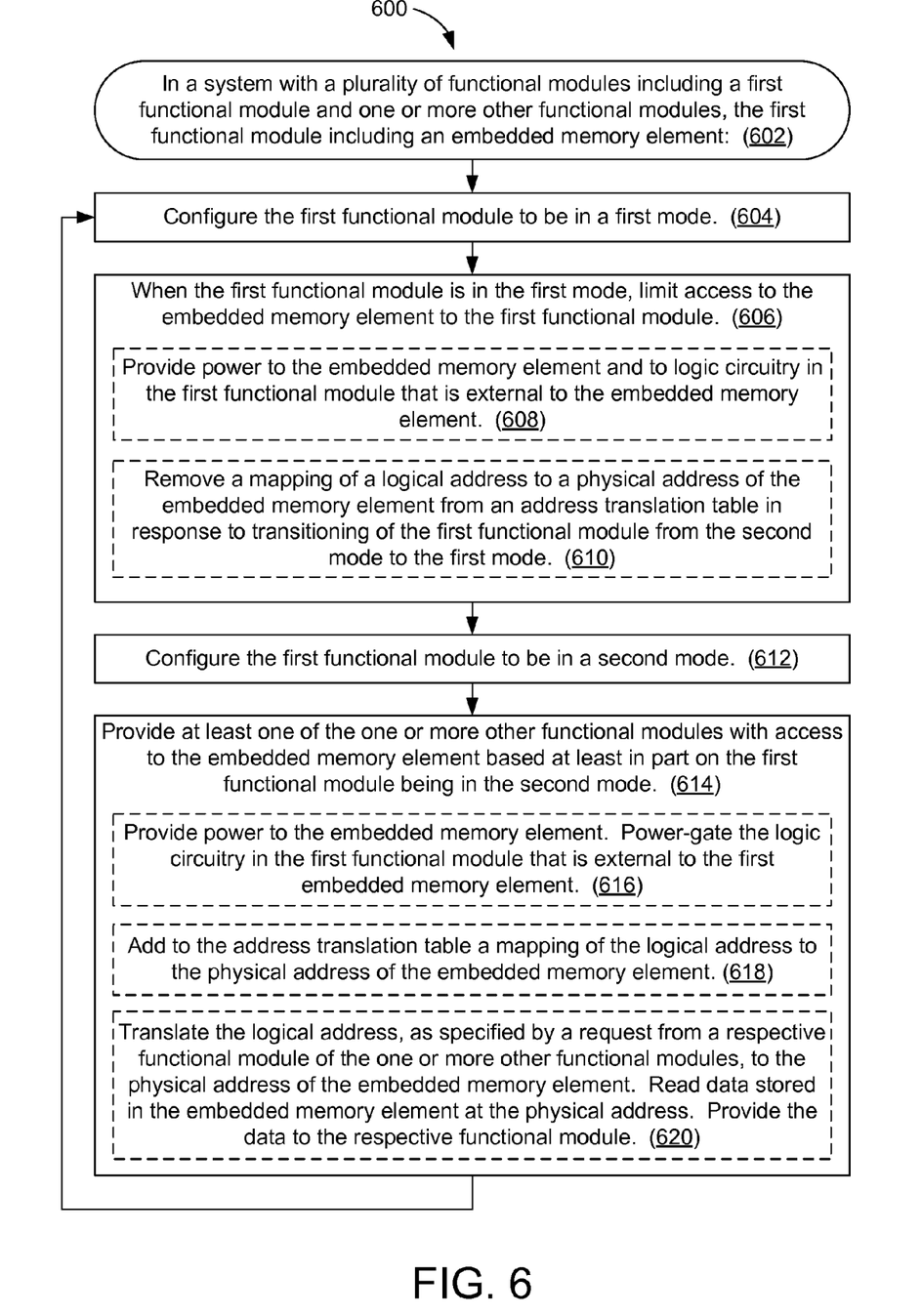
FIG. 6 is a flowchart showing a method of accessing embedded memory elements in accordance with some embodiments.

FIG. 6 is a flowchart showing a method 600 of accessing embedded memory elements 106 in accordance with some embodiments. The method 600 is performed (602) in a system with a plurality of functional modules, including a first functional module and one or more other functional modules. The first functional module includes an embedded memory element 106. For example, the method 600 is performed in the system 100 (FIG. 1) or 200 (FIG. 2), examples of which include the systems 300 (FIG. 3), 400 (FIG. 4), and 500 (FIG. 5). Examples of the plurality of functional modules include the functional modules 102-0 through 102-N (FIGS. 1 and 2); the functional modules 302-0 and 302-1 (FIG. 3); the functional modules 402-0 through 402-2 (FIG. 4); and the functional modules 502-0 and 502-1 (FIG. 5).

The first functional module is configured (604) to be in a first mode with respect to the embedded memory element 106, as opposed to a second mode.

When the first functional module is in the first mode, access to the embedded memory element 106 is limited (606) to the first functional module.

In some embodiments, when the first functional module is in the first mode, power is provided (608) to the embedded memory element 106 and to logic circuitry in the first functional module that is external to the embedded memory element 106 (e.g., to logic circuitry 104, FIG. 1 or 2).

In some embodiments, a mapping of a logical address to a physical address of the embedded memory element 106 is removed (610) from an address translation table 110 (FIG. 1) or 204 (FIG. 2) in response to the first functional module transitioning from the second mode to the first mode. Removing this mapping from the address translation table 110 or 204 limits access to the embedded memory element 106 to the first functional module.

The first functional module is configured (612) to be in the second mode. At least one of the one or more other functional modules is provided (614) with access to the embedded memory element 106 based at least in part on the first functional module being in the second mode. For example, a controller 108 (FIG. 1) or 202 (FIG. 2) allocates the embedded memory element 106 to one of the other functional modules, or allocates respective portions of the embedded memory element 106 to respective functional modules of the other functional modules. The providing of access to the embedded memory element 106 may be further based on the at least one functional module that is provided with access being in an operating mode.

In some embodiments, power is provided (616) to the embedded memory element 106 when the first functional module is in the second mode, while the logic circuitry in the first functional module that is external to the embedded memory element 106 (e.g., logic circuitry 104, FIG. 1 or 2) is power-gated.

In some embodiments, a mapping of the logical address to the physical address of the embedded memory element 106 is added (618) to the address translation table 110 (FIG. 1) or 204 (FIG. 2) when the functional module is in the second mode. Including the mapping in the address translation table 110 or 204 allows the other functional modules to access the embedded memory element 106.

In some embodiments, the logical address, as specified by a request from a respective functional module of the one or more other functional modules, is translated (620) to the physical address of the embedded memory element 106. Data stored in the embedded memory element 106 at the physical address is read and provided to the respective functional module.

The first functional module may alternate between the first mode and the second mode, such that the method 600 is repeated. Furthermore, the method 600 may be performed for each of multiple embedded memory elements 106 in the first functional module and/or in other functional modules.

While the method 600 includes a number of operations that appear to occur in a specific order, it should be apparent that the method 600 can include more or fewer operations. Two or more operations may be combined into a single operation, the order of operations may vary, and performance of two or more operations may overlap.

In some embodiments, the controller 108 (FIG. 1) or 202 (FIG. 2) (e.g., controller 314, FIG. 3; controller 410, FIG. 4; or controller 508, FIG. 5) is implemented in hardware. Alternatively, the functionality of the controller 108 (FIG. 1) or 202 (FIG. 2) is implemented in software (e.g., firmware). For example, all or a portion of the method 600 (FIG. 6) may be performed by software (e.g., firmware). A non-transitory computer-readable storage medium may store instructions for implementing the functionality of the controller 108 (FIG. 1) or 202 (FIG. 2) and/or for performing all or a portion of the method 600.

Figure 7:
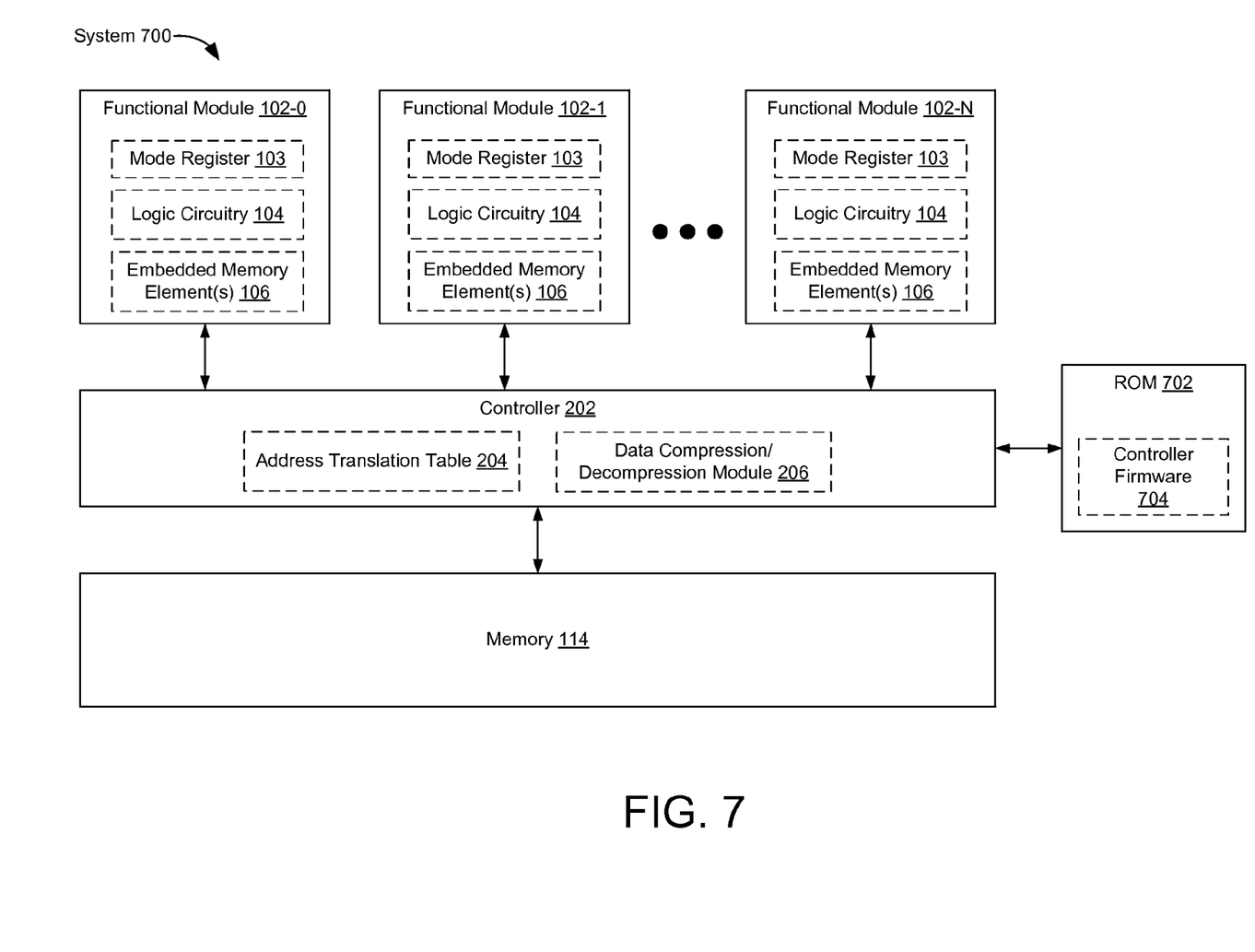
FIG. 7 is a block diagram of a system in which the functionality of the controller of any of FIGS. 1-5 is implemented in firmware in accordance with some embodiments.

FIG. 7 is a block diagram of a system 700 in which the functionality of the controller 202 (FIG. 2) is implemented in firmware in accordance with some embodiments. The system 700 is an example of the system 200 (FIG. 2). In the system 700, a read-only memory (ROM) 702 (e.g., a BIOS ROM) stores controller firmware 704 on a non-transitory computer-readable storage medium. The controller firmware 704 includes one or more programs with instructions configured for execution by the controller 202. For example, the controller 202 may be or include a processor that can execute the controller firmware 704. (Alternatively, a ROM 702 storing controller firmware 704 for the controller 108 may be coupled to the controller 108 in the system 100, FIG. 1). While the controller firmware 704 is shown in FIG. 7 as being stored in the ROM 702, it may alternately be stored in a different non-volatile memory (e.g., a Flash memory, hard-disk drive, etc.) coupled to the controller 108. In some embodiments, the controller firmware 704 includes one or more programs with instructions that, when executed by the controller 202 (or alternately, the controller 108), cause all or a portion of the method 600 to be performed.

In some embodiments, the controller firmware 704 includes instructions to set and/or track the modes of the functional modules 102-0 through 102-N and instructions to control address translation by maintaining the address translation table 110 (FIG. 1) or 204 (FIG. 2). For example, the controller firmware 704 may include instructions to add and remove logical-to-physical memory address translations to and from the address translation table 110 or 204, in order to provide access to embedded memory elements 106 (e.g., to allocate and de-allocate the embedded memory elements 106 to respective ones of the functional modules 102-0 through 102-N). The controller firmware 704 may include instructions to track the sizes of respective embedded memory elements 106, wherein allocation of the embedded memory elements 106 is performed in accordance with their sizes. In some embodiments, the controller firmware 704 includes instructions to write back data from an embedded memory element 106 to the memory 114 when the functional module 102 that contains the embedded memory element 106 transitions from the second mode to the first mode. This write-back may depend, for example, on whether a flag is set indicating that write-back should be performed. The controller firmware 704 may include instructions to set or reset this flag.

The foregoing description, for purpose of explanation, has been described with reference to specific embodiments. However, the illustrative discussions above are not intended to be exhaustive or to limit all embodiments to the precise forms disclosed. Many modifications and variations are possible in view of the above teachings. The disclosed embodiments were chosen and described to best explain the underlying principles and their practical applications, to thereby enable others skilled in the art to best implement various embodiments with various modifications as are suited to the particular use contemplated.

What is claimed is:

1. An electronic system, comprising:
   a plurality of functional modules including a first functional module and one or more other functional modules, the first functional module comprising an embedded memory element and being configurable in a plurality of modes including a first mode and a second mode, wherein access to the embedded memory element is limited to the first functional module when the first functional module is in the first mode and access to the embedded memory element is provided to the first functional module and at least one of the one or more other functional modules when the first functional module is in the second mode; and a controller to provide at least one of the one or more other functional modules with access to the embedded memory element based at least in part on the first functional module being in the second mode.

2. The electronic system of claim 1, wherein the controller is to translate a logical address specified in a request from one of the one or more other functional modules to a physical address of the embedded memory element.

3. The electronic system of claim 2, wherein:
the controller comprises an address translation table to map the logical address to the physical address of the embedded memory element when the first functional module is in the second mode; and
the controller is to remove a mapping of the logical address to the physical address of the embedded memory element from the address translation table in response to a transition of the first functional module from the second mode to the first mode.

4. The electronic system of claim 2, wherein:
each functional module of the plurality of functional modules comprises one or more embedded memory elements;
each functional module of the plurality of functional modules is configurable in a first mode and a second mode;
in the first mode of each functional module, the one or more embedded memory elements of the functional module are accessible only by the functional module; and
in the second mode of each functional module, the controller is configurable to provide access to the one or more embedded memory elements of the functional module to at least one other functional module of the plurality of functional modules.

5. The electronic system of claim 4, wherein the embedded memory elements of the plurality of functional modules are serially coupled to each other and the controller in a chain, the chain to provide memory access requests from the controller to the embedded memory elements of the plurality of functional modules.

6. The electronic system of claim 5, wherein each functional module further comprises an interface coupled to the controller separately from the chain, the interface to provide memory access requests to the controller.

7. The electronic system of claim 5, wherein:
the embedded memory elements of the plurality of functional modules comprise embedded memory elements of different data widths;
the chain has a data width; and
the plurality of functional modules further comprises wrappers associated with respective embedded memory elements to adapt the different data widths of the respective embedded memory elements to the data width of the chain.

8. The electronic system of claim 5, wherein:
the controller is to provide memory access requests to respective embedded memory elements through the chain, wherein the memory access requests comprise tokens specifying the embedded memory elements to which the memory access requests are directed; and
the plurality of functional modules further comprises parsers associated with respective embedded memory elements to parse the tokens.

9. The electronic system of claim 4, further comprising a crossbar interconnect to couple the embedded memory elements of the plurality of functional modules with the controller.

10. The electronic system of claim 1, wherein the first functional module is to be configured in the first mode when in an operating mode and is to be configured in the second mode when in an idle mode.

11. The electronic system of claim 10, wherein:
the first functional module further comprises logic circuitry external to the embedded memory element;
the logic circuitry is in a first power domain that is to receive power in the operating mode and be power-gated in the idle mode; and
the embedded memory element is in a second power domain that is to receive power in the operating mode and in the idle mode.

12. The electronic system of claim 10, wherein:
the first functional module comprises a graphics engine;
the one or more other functional modules comprise a display controller;
the second mode comprises a static-screen mode in which an image remains unchanged for successive frames; and
the first mode comprises a mode in which the image varies for successive frames.

13. A method, comprising:
in a system comprising a plurality of functional modules including a first functional module and one or more other functional modules, the first functional module comprising an embedded memory element:
when the first functional module is in a first mode, limiting access to the embedded memory element to the first functional module; and
providing at least one of the one or more other functional modules and the first functional module with access to the embedded memory element based at least in part on the first functional module being in a second mode.

14. The method of claim 13, wherein the system further comprises a controller coupled to the plurality of functional modules, the method further comprising:
in the controller, when the first functional module is in the second mode, translating a logical address specified by a request from a respective functional module of the one or more other functional modules to a physical address of the embedded memory element;
reading data stored in the embedded memory element at the physical address; and
providing the data to the respective functional module.

15. The method of claim 14, wherein the controller comprises an address translation table, the method further comprising:
when the first functional module is in the second mode, adding to the address translation table a mapping of the logical address to the physical address; and
removing the mapping of the logical address to the physical address from the address translation table in response to transitioning of the first functional module from the second mode to the first mode.

16. The method of claim 14, wherein:
each functional module of the plurality of functional modules is configurable in a first mode and a second mode and comprises one or more embedded memory elements; and
the method further comprises, for each functional module of the plurality of functional modules:

when the functional module is in the first mode, limiting access to the one or more embedded memory elements of the functional module to the functional module; and when the functional module is in the second mode, providing access to the one or more embedded memory elements of the functional module to at least one other functional module of the plurality of functional modules.

17. The method of claim 16, wherein:

the embedded memory elements of the plurality of functional modules are serially coupled to each other and the controller in a chain, the chain having a data width; and the method further comprises:

transmitting a memory access request from the controller onto the chain, the memory access request being directed to a respective embedded memory element having a data width distinct from the data width of the chain; and reading data from the respective embedded memory element, the reading comprising adapting the data from the data width of the respective embedded memory element to the data width of the chain.

18. The method of claim 17, wherein:

the memory access request comprises a token specifying that the memory access request is directed to the respective embedded memory element; and the method further comprises parsing the token to determine that the memory access request is directed to the respective embedded memory element.

19. The method of claim 13, wherein:

the first functional module further comprises logic circuitry external to the first embedded memory element; and the method further comprises:

configuring the first functional module in the first mode when the first functional module is in an operating mode;

in the operating mode, providing power to the embedded memory element and the logic circuitry;

configuring the first functional module in the second mode when the first functional module is in an idle mode; and in the idle mode, providing power to the embedded memory element and power-gating the logic circuitry.

20. A non-transitory computer-readable storage medium storing one or more programs configured for execution by a controller in a system that comprises the controller, a first functional module, and one or more other functional modules, the first functional module comprising an embedded memory element and being configurable in a first mode and a second mode, wherein access to the embedded memory element is limited to the first functional module when the first functional module is in the first mode and access to the embedded memory element is provided to the first functional module and at least one of the one or more other functional modules when the first functional module is in the second mode, the one or more programs comprising:

instructions to add to an address translation table a mapping of a logical address to a physical address of the embedded memory element when the first functional module is in the second mode; and instructions to remove the mapping of the logical address to the physical address from the address translation table in response to a transition of the first functional module from the second mode to the first mode.

* * * * *